(12) United States Patent
Eno

(10) Patent No.: US 9,612,319 B2
(45) Date of Patent: Apr. 4, 2017

(54) LASER SURVEYING DEVICE

(71) Applicant: Kabushiki Kaisha TOPCON, Tokyo-to (JP)

(72) Inventor: Taizo Eno, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 14/810,859

(22) Filed: Jul. 28, 2015

(65) Prior Publication Data

US 2016/0061939 A1 Mar. 3, 2016

(30) Foreign Application Priority Data

Aug. 26, 2014 (JP) ................... 2014-171374

(51) Int. Cl.
*G01S 7/481* (2006.01)
*G01S 17/10* (2006.01)
*G01S 7/484* (2006.01)
*G02B 3/14* (2006.01)
*G02B 26/12* (2006.01)

(52) U.S. Cl.
CPC ............ *G01S 7/4814* (2013.01); *G01S 7/481* (2013.01); *G01S 7/484* (2013.01); *G01S 17/10* (2013.01); *G02B 3/14* (2013.01); *G02B 26/128* (2013.01)

(58) Field of Classification Search
CPC ........ G01S 7/4816; G01S 17/89; G01S 7/484; G01S 7/486; G01S 7/4865; G01S 17/10; H04N 13/0207; H04N 13/0253; H04N 13/0203; H04N 13/0296
See application file for complete search history.

(56) References Cited

U.S. PATENT DOCUMENTS

| 2010/0091263 | A1 | 4/2010 | Kumagai et al. |
| 2010/0128109 | A1* | 5/2010 | Banks ................. G01S 7/4816 348/46 |
| 2011/0013172 | A1* | 1/2011 | Takahashi ............ G01S 7/4802 356/4.01 |
| 2011/0270563 | A1 | 11/2011 | Kanokogi et al. |

FOREIGN PATENT DOCUMENTS

| DE | 202012105023 U1 | 1/2013 |
| JP | 2010091445 A | 4/2010 |
| JP | 2010169525 A | 8/2010 |

OTHER PUBLICATIONS

European communication dated Jan. 15, 2016 in corresponding European patent application No. 15178039.2

* cited by examiner

*Primary Examiner* — Luke Ratcliffe
(74) *Attorney, Agent, or Firm* — Nields, Lemack & Frame, LLC

(57) ABSTRACT

The invention provides a laser surveying device, which comprises a light emitting unit for emitting a pulsed distance measuring light, a photodetection unit for receiving a reflected pulsed distance measuring light and a control arithmetic unit for controlling the light emitting unit and for calculating a distance to an object to be measured based on a photodetection signal from the photodetection unit, wherein the light emitting unit has a pump laser source for emitting a pump laser beam, a spot diameter changing means for changing a spot diameter of the pump laser beam, and an optical cavity for emitting the pump laser beam entering via the spot diameter changing means as the pulsed distance measuring light.

6 Claims, 3 Drawing Sheets

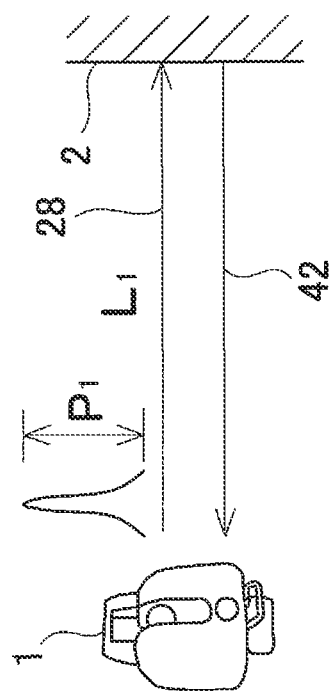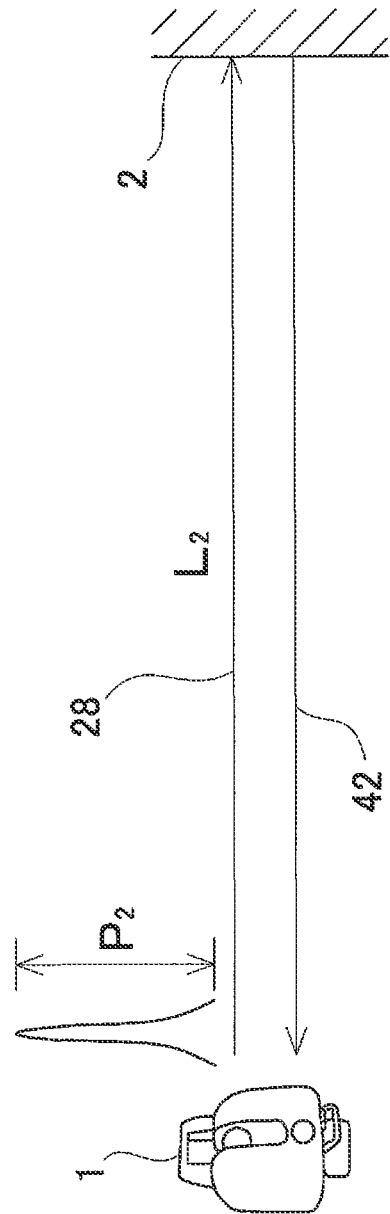

LASER SURVEYING DEVICE

BACKGROUND OF THE INVENTION

The present invention relates to a laser surveying device which carry out distance measurement by projecting a laser beam to an object to be measured and receiving a reflected light from the object to be measured.

Conventionally, a laser surveying device has been known, which projects a laser beam in pulses to an object to be measured, receives a reflection light, from the object to be measured by a photodetection element and carries out distance measurement per each pulse.

Normally, in a case where distance measurement is carried out by a pulsed distance measuring light, the distance measurement is carried out by a TOF (Time of Flight) method which carry out distance measurement by emitting the next pulsed distance measuring light after receiving a pulsed distance measuring light reflected from the object to be measured.

In a case where distance measurement is carried out on an object to be measured as located at a distant place such as a bridge, a dam, etc. by the TOF method, it is desirable to emit a pulsed distance measuring light with high peak power and to carry out distance measurement so that a reflected pulsed distance measuring light having a measurable intensity can be received. On the contrary, in a case where distance measurement is carried out on an object to be measured is at a near distance, e.g. in a room or the like, it is desirable to emit a pulsed distance measuring light with a high repetition frequency and to carry out distance measurement so that measurement with high density can be carried out. In this case, there is no need to use a pulsed distance measuring light with high peak power.

As described above, in the distance measurement by the TOE method, the peak power of the pulsed distance measuring light differs according to the distance to the object to be measured. However, in the conventional type laser surveying device, the peak power and the repetition frequency of the pulsed distance measuring light as projected to the object to be measured are fixed. As a result, it has been necessary to use different types of laser surveying device in a case where an object to be measured is at near distance and in a case where an object to be measured is at long distance.

SUMMARY OF THE INVENTION

It is an object of the present invention to provide a laser surveying device, by which it is possible to change a peak power of a pulsed distance measuring light emitted to an object to be measured.

To attain the object as described above, a laser surveying device according to the present invention comprises a light emitting unit for emitting a pulsed distance measuring light, a photodetection unit for receiving a reflected pulsed distance measuring light and a control, arithmetic unit for controlling the light emitting unit and for calculating a distance to an object to be measured based on a photodetection signal from the photodetection unit, wherein the light emitting unit has a pump laser source for emitting a pump laser beam, a spot diameter changing means for changing a spot diameter of the pump laser beam, and an optical cavity for emitting the pump laser beam entering via the spot diameter changing means as the pulsed distance measuring light.

Further, in the laser surveying device according to the present invention, the spot diameter changing means has a liquid lens, wherein the spot diameter changing means changes a focal length of the liquid lens by changing a voltage to be applied on the liquid lens and changes a pump spot diameter of the pump laser beam entering the optical cavity.

Further, in the laser surveying device according to the present invention, the liquid lens has two or more electrodes divided in a circumferential direction, the spot diameter changing means applies voltage on each of the electrodes, and changes a focusing direction of the pump laser beam.

Furthermore, in the laser surveying device according to the present invention, the control arithmetic unit increases a light emission frequency when a spot diameter of the pump laser beam is small, and decreases the light emission frequency when the spot diameter of the pump laser beam is large.

According to the present invention, the laser surveying device comprises a light emitting unit for emitting a pulsed distance measuring light, a photodetection unit for receiving a reflected pulsed distance measuring light and a control arithmetic unit for controlling the light, emitting unit and for calculating a distance to an object to be measured based on a photodetection signal from the photodetection unit, wherein the light emitting unit has a pump laser source for emitting a pump laser beam, a spot diameter changing means for changing a spot diameter of the pump laser beam, and an optical cavity for emitting the pump laser beam entering via the spot diameter changing means as the pulsed distance measuring light. As a result, the peak power of the pulsed distance measuring light as emitted from the light emitting unit is capable of being changed, and it is possible to perform distance measurement at a near distance where the pulsed distance measuring light with low peak power and high repetition frequency is demanded and to carry out distance measurement at a long distance where the pulsed distance measuring light with high peak power and low repetition frequency is demanded.

Further, according to the present invention, in the laser surveying device, the spot diameter changing means has a liquid lens, wherein the spot diameter changing means changes a focal length of the liquid lens by changing a voltage to be applied on the liquid lens and changes a pump spot diameter of the pump laser beam entering the optical cavity. As a result, a motor and the like to drive a lens is not necessary, devices can be miniaturized, and power consumption can be reduced.

Further, according to the present invention, in the laser surveying device, the liquid lens has two or more electrodes divided in a circumferential direction, the spot diameter changing means applies voltage on each of the electrodes, and changes a focusing direction of the pump laser beam. As a result, it is possible to adjust an incident position of the pump laser beam entering the optical cavity and the most suitable pumping condition is capable of being realized.

Furthermore, according to the present invention, in the laser surveying device, the control arithmetic unit increases a light emission frequency when a spot diameter of the pump laser beam is small, and decreases the light emission frequency when the spot diameter of the pump laser beam is large. As a result, optimum distance measurement can be accomplished depending on the distance to the object to be measured.

BRIEF DESCRIPTION OF THE DRAWINGS

FIG. 4A is a drawing to explain a case where distance is measured to an object to be measured, which is located at a near distance by the laser surveying device according to an embodiment of the present invention, and FIG. 4B is a drawing to explain a case where distance is measured to an object to be measured, which is located at a long distance, by she laser surveying device.

DETAILED DESCRIPTION OF THE PREFERRED EMBODIMENT

Description will be given below on an embodiment of the present invention by referring to the attached drawings.

First, referring to FIG. 1, a description will be given below on an example of a laser surveying device, to which the present invention is applied. It is to be noted that a laser surveying device according to the present embodiment is a laser surveying device, by which light pulses of laser beam are projected and a distance measurement is carried out per each light pulse.

Figure 1:
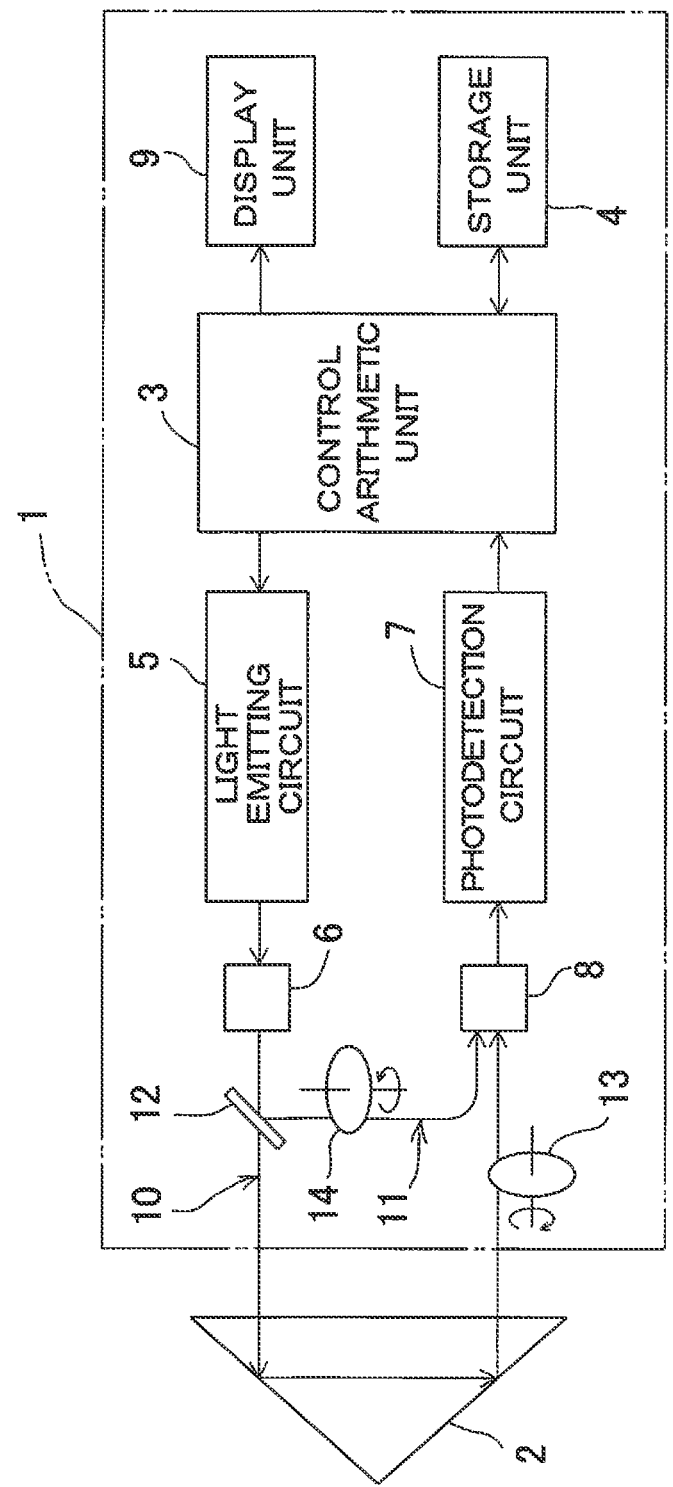
FIG. 1 is a schematical block diagram to show a laser surveying device according to an embodiment of the present invention.

In FIG. 1, reference numeral 1 denotes a laser surveying device and reference numeral 2 denotes an object to be measured (a target), e.g. a prism.

The laser surveying device 1 comprises a control arithmetic unit 3, a storage unit 4, a light emitting circuit 5, a light emitting unit 6 which is a light source, a photodetection circuit 7, a photodetection element 8 which is a photodetector, and a display unit 9.

The storage unit 4 has a data storage region and a program storage region. Data such as a distance measurement data, data for associating a voltage of a liquid lens (to be described later) with a curvature of de liquid lens, and other data are stored in the data storage region. Various types of programs are stored in the program storage region. These programs include: a sequence program for executing distance measurement by the laser surveying device 1, a distance calculating program for calculating a distance based on a photodetection result from the photodetection circuit 7, a peak power change program for changing a peak power of a light, pulse to be projected, and other programs.

The light emitting unit 6 is a light source which emits a laser beam by pulse emission and is driven by the light, emitting circuit 5. The light pulse as emitted is projected to the object to be measured 2 via a distance measuring optical path (hereinafter, referred as "external optical path") 10 as a pulsed distance measuring light, and a reflection light reflected by the object to be measured 2 is received by the photodetection element 8 via the external optical path 10. Further, the laser surveying device 1 has an internal reference optical path (hereinafter, referred as "internal optical path") 11, and the internal optical path 11 is configured to guide one part of the pulsed distance measuring light emitted by the light emitting unit 6 to the photodetection element 8 as an internal reference light.

It is so arranged that the external optical path 10 is divided, by a half mirror 12, one part of the pulsed distance measuring light is divided by the half mirror 12 as an internal reference light and the one part of the pulsed distance measuring light is guided to the internal optical path 11.

An external light amount adjusting means 13 and an internal light amount adjusting means 14 are provided on a return path of the external optical path 10 and on the internal optical path 11 respectively, and the external light amount adjusting means 13 and the internal light amount adjusting means 14 are capable of operating independently. The light amount is adjusted in such a manner that the light amount of the reflected pulsed distance measuring light entering via the external optical path 10 and the light amount of the internal reference light entering via the internal optical path. 11 are approximately equal to each other.

Each of the external light amount adjusting means 13 and the internal light amount adjusting means 14 is an aperture, for instance, and is a disk, having aperture orifices where opening diameters gradually decrease or opening diameters gradually increase and the aperture orifices are provided on the same circumference. By rotating the disk by an actuator such as a motor and the like, it becomes possible to gradually increase or gradually decrease the light mount entering the photodetection element 8. Further, the external light amount adjusting means 13 and the internal light amount adjusting means 14 are density filters and may be designed so that an optical transmissivity is gradually decreased or gradually increased on the same circumference and along a circumferential direction.

The control arithmetic unit 3 controls a light emitting condition, e.g. a light emission intensity and a light emission frequency, of the light emitting unit. 6 via the light emitting circuit 5 and controls the adjustment of light amount by the external light amount adjusting means 13 and the adjustment of light amount by the internal light amount adjusting means 14. Further, the control arithmetic unit 3 controls a spot diameter changing means (to be described, later) and controls a size of a spot diameter of a pump laser beam.

In a case where distance measurement is carried out by the laser surveying device 1, the pulsed distance measuring light is emitted by driving the light emitting circuit 5, projected to the object to be measured 2 via the external optical path 10 and receives the reflected light from the object to be measured 2 by the photodetection element 8. A photodetection signal from the photodetection element 8 is signal processed and the like by the photodetection circuit 7 and is stored in the storage unit 4.

Further, an internal, reference light is received by the photodetection element 8 for a predetermined time period via the internal optical path 11 and a photodetection signal is stored in the storage unit 4 after being signal processed as required by the photodetection circuit 7. The control arithmetic unit 3 calculates a time difference between the moment when a reflected pulsed distance measuring light is received by the photodetection element 8 and the moment when the internal reference light is received by the photodetection element 8, and the control arithmetic unit 3 calculates a distance to the object to be measured 2 based on the time difference and the light velocity.

It is to be noted that in a case where high accuracy is not required in the distance measurement, distance measurement may be carried out by only the reflected distance measuring light, by intercepting the internal optical path 11 or by omitting the internal reference light.

Further, in a distance calculation, since an internal optical path length of the internal optical path 11 is already known, an accurate distance measurement can be accomplished by subtracting the internal optical path length during the calculation process, and an error on the circuit of the light emitting circuit 5 and the photodetection circuit 7 can be offset.

Figure 2:
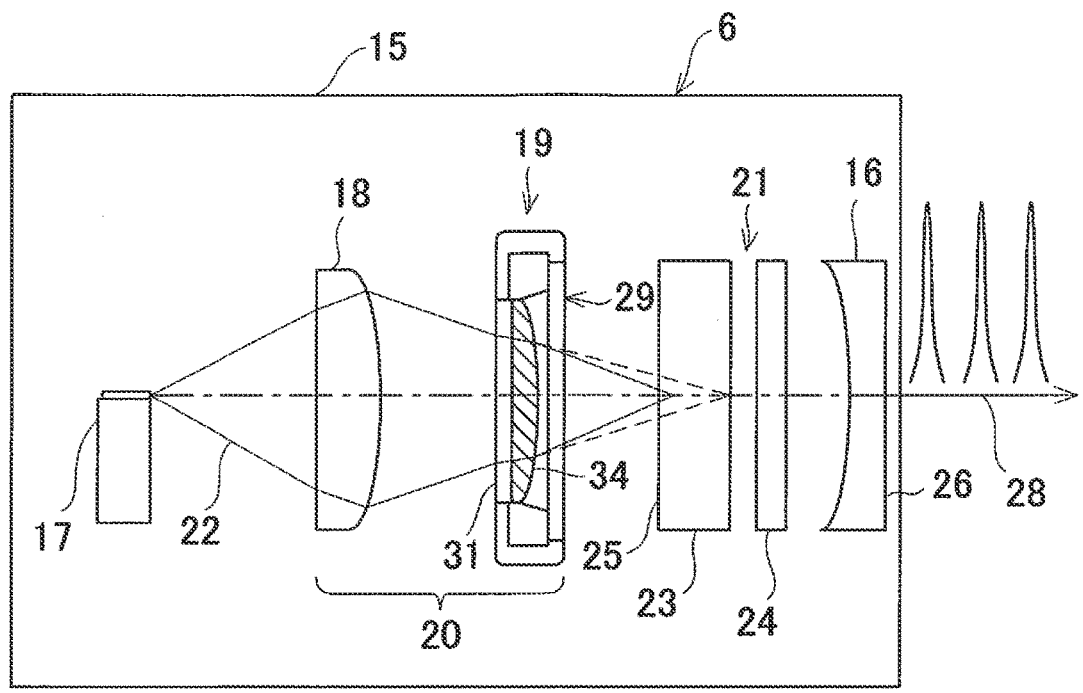
FIG. 2 is a schematical side view to show a light emitting unit of the laser surveying device.

Next, by referring to FIG. 2, description will be given on details of the light emitting unit 6.

The light emitting unit 6 has a housing 15, and a pump laser source 17, a liquid lens 19 which contains a first focus lens 18 and a second focus lens and an optical cavity 21 are provided in the housing 15. In FIG. 2, reference numeral 16 denotes a laser output coupler mirror, which is one part of the housing 15. Further, the first focus lens 18 and the liquid lens 19 make up together the spot diameter changing means 20.

The pump laser source 17 is a laser diode, for instance, and is configured so as to emit a pump laser beam 22 with a wavelength of 808 nm. The first focus lens 18 and the liquid lens 19 focuses the pump laser beam 22 and enters the pump laser beam 22 with the predetermined pump spot diameter into the optical cavity 21.

Further, the optical cavity 21 comprises a laser crystal 23 such as an Nd:YAG crystal and the like, a saturable absorber 24 such as a Cr:YAG crystal and the like, a first cavity mirror 25 provided on an incident surface and a second cavity mirror 26 provided on an output coupler surface. The pump laser beam 22 entered through the liquid lens 19 to the optical cavity 21 is absorbed by the laser crystal 23 and emits a near-infrared light with a wavelength of 1064 nm. The near-infrared light oscillates in a Q switch pulse operation by the saturable absorber 24 and the optical cavity 21, and is so arranged that a pulsed distance measuring light 28 with a wavelength of 1064 nm having a predetermined peak power is emitted through the laser output coupler mirror 16.

Here, a peak power P of the pulsed distance measuring light 28 can be given by the following equation.

$$P=(hvAl'/tr)\ln(1/R)\phi_{max}'$$

In the equation as given above, reference letter h denotes a Planck's constant, reference letter v denotes a number of vibration, reference letter A denotes a pump spot diameter of the pump laser beam. 22 entering the optical cavity 21, reference letter l' denotes a length of the optical cavity 21, reference letters tr denote a cavity round-trip time, reference letter R denotes a multiplication value of reflectivity of the first cavity mirror 25 and the second cavity mirror 26, and reference symbol "$\phi_{max}$'" denotes a number of photons accumulated at the optical cavity 21. Therefore, the peak power of the pulsed distance measuring light 28 is proportional to the pump spot diameter of the entering pump laser beam 22.

Next, description will be given on the liquid lens 19 by referring to FIG. 3A and FIG. 3B.

The liquid lens 19 has such structure where a liquid lens element is sealed inside and in a central portion, a window unit. 29 is formed where the pump laser beam 22 passes through. Both the front-and-rear surfaces of the window unit 29 are sealed by sealing plates 31 and 31, which are made of transparent resin and the like, in such a manner that an inside portion is liquid-tight. Inside the window unit 29, a conductive aqueous solution. 32 and a non-conductive oil 33 are sealed in as liquid lens elements, and a lens unit. 34 is formed by a boundary surface of the aqueous solution 32 and the oil 33.

Further, the liquid lens 19 has a ring-shaped lens frame 35 to form the window unit 29. On a side of the lens frame 35 where the pump laser beam 22 enters, a slope 36 with its diameter gradually increasing is formed. The lens frame 35 is a first electrode. Further, between the lens frame 35 and the sealing plate 31 on the projecting side, a ring-like insulator 37 and a second electrode 38 are provided along an outer edge, and the lens frame 35 and the second electrode 38 are electrically insulated from each other.

The second electrode 38 is connected with a negative electrode of a power source 41 for focus adjustment via a voltage regulator 39, and the lens frame 35 is connected with a positive electrode of the power source 41 for focus adjustment. When a voltage is applied on the lens frame 35, a force trying to come in contact with the slope 36 acts on the aqueous solution 32. As a result, a central portion of the oil 33 is pushed out toward the projected surface side, and curvature of the lens unit 34 is changed. Further, the voltage regulator 39 adjusts the voltage applied according to a control signal from the control arithmetic unit 3, and the curvature of the lens unit 34 can be changed by adjusting the voltage.

Figure 3A:
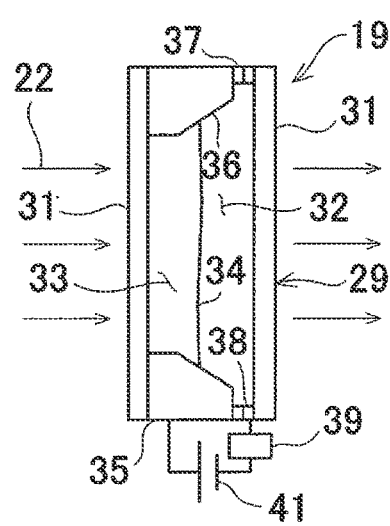
FIG. 3A is a schematical side view to show a case where voltage to be applied to a liquid lens used at a light emitting unit is low.
Figure 3B:
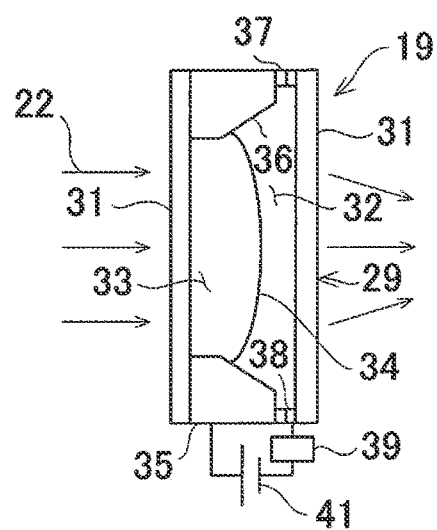
FIG. 3B is a schematical side view to show a case where voltage to be applied to the liquid lens is high.

FIG. 3A shows a condition where voltage of 45V is applied on the lens frame 35 and FIG. 3B shows a condition where voltage of 60V is applied on the lens frame 35. As shown in FIG. 3A and FIG. 3B, by changing the voltage to be applied on the lens frame 35, it becomes possible to change the curvature of the lens unit 34 and to change a focal length of the liquid lens 19.

Data which associate the curvature of the lens unit 34 with the voltage to be applied on the lens frame 35 is stored in the storage unit. 4 (see FIG. 1) in advance. By adjusting the applied voltage by means of the voltage regulator 39, it is possible to control the lens unit 34 to the curvature as desired and to control the liquid lens 19 so as to have the focal length as desired.

Therefore, by changing the focal length of the liquid lens 19, it is possible to change the soot diameter of the pump laser beam 22 entering the optical cavity 21, and to control in such a manner that the pulsed distance measuring light 28 as emitted from the light emitting unit 6 has the peak power as desired.

Next, referring to FIG. 4A and FIG. 4B, description will be given on a case where measurement is carried out on the object to be measured 2 by the laser surveying device 1. FIG. 4A shows a case where the object to be measured 2 is at a near distance, and FIG. 4B shows a case where the distance to the object to be measured 2 is at a long distance.

In FIG. 4A and FIG. 4B, reference letter P denotes a peak power of the pulsed distance measuring light 28 and reference letter L denotes a distance to the object to be measured 2. Pulse frequency f (Hz) and shuttle time t (s) can be expressed by the following equations.

$$t=2L/c \text{ (light velocity: } 3\times10^8 \text{ m/s)}$$

$$f=1/t.$$

Further, the peak power of a reflected pulsed distance measuring light 42 as reflected by the object to be measured 2 is proportional to $1/L^2$.

Therefore, as shown in FIG. 4A, in a case where the value of distance L1 to the object to be measured 2 is small, shuttle time t becomes shorter and pulse frequency f becomes longer. That is, it is possible to increase the repetition frequency (pulse frequency). Further, in a case where the value of the distance L1 is small, since an attenuation of the reflected pulsed distance measuring light 42 will be decreased, a peak power P1 of the pulsed distance measuring light 28 projected from the laser surveying device 1 may be smaller.

Further, as shown in FIG. 4B, in a case where the value of distance L2 to the object to be measured 2 is large, shuttle time t becomes longer and pulse frequency f becomes smaller. Further, in a case where the value of the distance L2 is large, since an attenuation of the reflected pulsed distance measuring light. 42 will be increased, it is necessary to increase a peak power P2 of the pulsed distance measuring light 28 projected from the laser surveying device 1, while the repetition frequency may be smaller.

Therefore, in a case where the distance measurement is carried out on the object to be measured 2 at a near position such as inside a room and the like, since the spot diameter changing means 20 increases the voltage to be applied on the lens frame 35 and decreases the focal length of the liquid lens 19 (the focal position is coincided with the optical cavity 21), the pump spot diameter of the pump laser beam 22 entering the optical cavity 21 will be smaller, and the pulsed distance measuring light 23 with low peak power and high repetition frequency can be projected. By projecting the pulsed distance measuring light 28 with low peak power and high repetition frequency, it is possible to carry out distance measurement with respect to the object cc be measured 2 in a short time and with higher density.

Further, in a case where distance measurement is carried out on the object to be measured 2 at a distant position such as a bridge, a dam, etc., since the spot diameter changing means 20 decreases the voltage to be applied on the lens frame 35 and makes the focal length of the liquid lens 19 longer, the pump laser beam 22 entering the optical cavity 21 become an unfocused condition, the spot diameter is increased, and it is possible to project the pulsed distance measuring light 28 with high peak power and low repetition frequency. By projecting the pulsed distance measuring light 28 with high peak power and low repetition frequency, the reflected pulsed distance measuring light 42 as reflected by the object to be measured 2 is capable of having a sufficient peak power. As a result, a distance measurement with respect to the object to be measured 2 can be performed in a reliable manner.

As described above, in the present embodiment, the spot diameter changing means 20 is provided inside the Light emitting unit 6 and since the pump spot diameter can be changed by the pump laser beam 22 entering the optical cavity 21 by the spot diameter changing means 20, it is possible to change the peak power of the pulsed distance measuring light 28 projected by the light emitting unit 6.

Therefore, the single laser surveying device 1 enables to perform a distance measurement at near distance where the pulsed distance measuring light 28 with low peak power and high repetition frequency is required and a distance measurement at long distance where the pulsed distance measuring light 28 with high peak power and low repetition frequency is required.

Further, in the present embodiment, the first focus lens 18 and the liquid lens 19 are used as the spot diameter changing means 20, the focal length is changed by the amount of voltage so be applied on the liquid lens 19 and that the pump spot diameter can be changed. As a result, a motor or the like for changing the position of the lens is not necessary, the miniaturization and simplification of a device are performed and this contributes to the decrease of power consumption.

It is to be noted that although the first focus lens 18 and the liquid lens 19 are used as the spot diameter changing means 20 in the present embodiment, if the focal length of the pump laser beam 22 is changed and if the pump spot diameter can be changed, other arrangements may be adopted.

For instance, by providing two lenses which can move along an optical axis of the pump laser beam 22, and by making the two lenses to be closer to each other or to be separated from each other by means of a zoom mechanism (not shown), it may be arranged so that the focal length of the pump laser beam 22 is changed and the pump spot diameter is changed. Further, a lens holder having a plurality of lenses with different focal lengths may be provided and by changing over the lens positioned on the optical axis of the pump laser beam 22 and by rotating the lens holder, it may be arranged so that she focal length of the pump laser beam 22 is changed and the pump spot diameter is changed.

Further, in the present embodiment, although the lens frame 35 of the liquid lens 19 and the second electrode 38 are designed in ring shape, it may be arranged in such a manner that the lens frame. 35 and the second electrode 38 are divided to 8 parts in a circumferential direction, for instance, and voltage can be applied by the spot diameter changing means 20 for each of the electrodes thus divided.

By applying different voltage values for each of the electrodes by the spot diameter changing means 20, the shape of the lens unit 34 changes. Since the projecting direction of the pump laser beam 22 which passes through the liquid lens 19 can be changed, the entering position of the pump laser beam 22, which enters the optical cavity 21, can be adjusted, and thereby the optimal pumping condition is realized.

The invention claimed is:

1. A laser surveying device, comprising a light emitting unit for emitting a pulsed distance measuring light, a photodetection unit for receiving a reflected pulsed distance measuring light and a control arithmetic unit for controlling said light emitting unit and for calculating a distance to an object to be measured based on a photodetection signal from said photodetection unit, wherein said light emitting unit has a pump laser source for emitting a pump laser beam, an optical cavity for emitting said pump laser beam as said pulsed distance measuring light and a spot diameter changing means provided between said pump laser source and said optical cavity, and wherein said spot diameter changing means enables to change a pump spot diameter of said pump laser beam entering said optical cavity.

2. A laser surveying device according to claim 1, wherein said spot diameter changing means has a liquid lens, wherein said spot diameter changing means changes a focal length of said liquid lens by changing a voltage to be applied on said liquid lens and changes said pump spot diameter of said pump laser beam entering said optical cavity.

3. A laser surveying device according to claim 2, wherein said liquid lens has two or more electrodes divided in a circumferential direction, said spot diameter changing means applies voltage on each of the electrodes, and changes a focusing direction of said pump laser beam.

4. A laser surveying device according to claim 1, wherein said control arithmetic unit increases a light emission frequency when a spot diameter of said pump laser beam is small, and decreases the light emission frequency when the spot diameter of said pump laser beam is large.

5. A laser surveying device according to claim 2, wherein said control arithmetic unit increases a light emission frequency when a spot diameter of said pump laser beam is small, and decreases the light emission frequency when the spot diameter of said pump laser beam is large.

6. A laser surveying device according to claim 3, wherein said control arithmetic unit increases a light emission frequency when a spot diameter of said pump laser beam is small, and decreases the light emission frequency when the spot diameter of said pump laser beam is large.

* * * * *